US005189085A

United States Patent [19]

Horacek

[11] Patent Number: 5,189,085

[45] Date of Patent: Feb. 23, 1993

[54] FLAMEPROOF PLASTICS CONTAINING UREA CYANURATE

[75] Inventor: Heinrich Horacek, Linz, Austria

[73] Assignee: Chemie Linz Gesellschaft m.b.H., Linz, Austria

[21] Appl. No.: 771,200

[22] Filed: Oct. 4, 1991

[30] Foreign Application Priority Data

Oct. 15, 1990 [AT] Austria .......... 2069/90

[51] Int. Cl.[5] .......... C08J 5/10; C08K 5/34; C08L 35/04

[52] U.S. Cl. .......... 524/101; 524/86

[58] Field of Search .......... 524/86, 101

[56] References Cited

U.S. PATENT DOCUMENTS

| | | | |
|---|---|---|---|
| 4,298,518 | 11/1981 | Ohmura et al. | 260/32.6 NA |
| 4,321,189 | 3/1982 | Ohshita et al. | 524/101 |
| 4,866,114 | 9/1989 | Taubitz et al. | 524/100 |

FOREIGN PATENT DOCUMENTS

| | | |
|---|---|---|
| 0371652 | 6/1990 | European Pat. Off. . |
| 0389768 | 10/1990 | European Pat. Off. . |
| 3228863 | 2/1984 | Fed. Rep. of Germany . |
| 3540524 | 5/1987 | Fed. Rep. of Germany . |

OTHER PUBLICATIONS

Chemical Abstracts 100:175946y (1984).

Chemical Abstracts 107:177208c (1987).

*Primary Examiner*—Paul R. Michl

*Assistant Examiner*—U. K. Rajguru

*Attorney, Agent, or Firm*—Wenderoth, Lind & Ponack

[57] ABSTRACT

Flameproof plastic which contains urea cyanurate as flame retardant.

8 Claims, No Drawings

FLAMEPROOF PLASTICS CONTAINING UREA CYANURATE

The invention relates to plastics which contain urea cyanurate in order to improve their flameproof characteristics.

The halogen-containing flame retardants customarily used do indeed have a good action but they have the decisive disadvantage that in the event of a fire, in particular in the event of a prolonged fire, they liberate toxic and corrosive chlorine compounds and bromine compounds. Halogen-free flameproofing agents, for example melamine or melamine cyanurate (U.S. Pat. No. 4,298,518), have already been employed in order to eliminate these disadvantages.

Melamine has, inter alia, the disadvantage that it tends to effloresce during processing of the plastics, as a result of which some of it migrates to the surface and, for example, forms a troublesome coating in the injection moulds. Melamine cyanurate tends to sublime on incorporation in the plastic, the plastic foaming somewhat and the bulk density being reduced. Since melamine is also a high-grade starting material, for example for the preparation of high-grade plastics, it was desirable to provide flameproofing agents which are based on other substances and which at the same time have a sufficiently good flame-retardant action for plastics. It has been found, surprisingly, that urea cyanurate meets these requirements and despite the low nitrogen content in the molecule shows a good flame-retardant action for plastics.

The invention accordingly relates to flameproof plastics which contain urea cyanurate.

Urea cyanurate is suitable as flame retardant both for thermoplastics and for pressure-setting plastics or elastomers. Suitable plastics are, for example, those from the group comprising polyolefins, such as, for example, polyethylene, polypropylene or ethylene/propylene copolymers, polybutylene or polymethylpentene, polyvinyl acetate, polyamides, polyacrylonitrile or polyacrylonitrile-containing plastics, such as, for example, ABS (acrylonitrile/butadiene/styrene copolymer) or SAN (styrene/acrylonitrile copolymer), thermoplastic or crosslinked polyurethanes, thermoplastic unsaturated or crosslinked polyesters, epoxides, acrylic resins or urea-formaldehyde, melamine-formaldehyde or phenolformaldehyde resins. The plastics can also be foamed. It is also possible to provide mixtures of various plastics or copolymers of various monomers, for example ethylene/propylene copolymers, with a flame-retardant finish using urea cyanurate. Urea cyanurate proves to be a particularly suitable flame retardant for nitrogen-containing plastics, such as, for example, polyamides, polyurethanes, polyacrylonitrile or polyacrylonitrile-containing plastics. In addition to its good flame-retardant action, urea cyanurate has the additional advantage that it has a very high decomposition point of about 400° C. and that it is sparingly soluble in water.

Urea cyanurate can be used on its own or together with other flame retardants. Suitable other flame retardants are preferably halogen-free flame retardants such as, for example, melamine, melamine cyanurate, phosphorus-based flame retardants, for example ammonium polyphosphate, phosphoric acid esters and red phosphorus, or flame retardants based on boric acid esters.

The flame retardant plastics are prepared, for example, by mixing urea cyanurate with the particular plastic. In the case of thermoplastics, the mixture can subsequently be melted, for example in an extruder. In the case of reactive resins, it is also possible already to add urea cyanurate to the reactants for the preparation of the plastic in the course of its preparation. For example, in the case of polyurethanes it is possible already to add urea cyanurate, and optionally further flame retardants, to the polyols or the polyisocyanates prior to the polymerisation reaction.

Urea cyanurate in which at least 95% by weight has a particle size of at most 0.025 mm is preferably used for providing the plastics with a flame-retardant finish. The urea cyanurate content of the plastics is usually between 1 and 30% by weight, preferably about 5 to 20% by weight, depending on the particular requirements in respect of flame resistance.

In the following Examples the following plastics were provided with a flame-retardant finish:

PA 6 Polyamide 6 (Ultramid B4, BASF)

PA 6,6 Polyamide 6,6 (Durethane A31, Bayer)

TPU Thermoplastic polyurethane (Desmopan Shore A80, Bayer)

ABS Acrylonitrile/butadiene/styrene copolymer (Terluran 99S, BASF)

SAN Styrene/acrylonitrile copolymer (Luran 53, BASF)

PP Polypropylene (Daplen PP CS10, PCD Polymere)

PREPARATION OF UREA CYANURATE 600 g of water and 180.2 g (3 mol) of urea were heated to 90° C. and 387.2 g (3 mol) of cyanuric acid were added, with stirring. After stirring for a further 2 hours at 90° C., the urea cyanurate formed was filtered off with suction, washed twice with cold water and dried overnight at 105° C. in an oven. The melting point was 245 -265° C.

EXAMPLE 1

5 kg/h of PA 6 and 0.32 kg/h of urea cyanurate ($UC_y$) were metered separately into a twin-screw extruder (LSM 30/34 GL 9R, Leistritz), melted and homogenised at 300° C., extruded through a 2 mm orifice die and granulated by means of cold chopping. The granules were then pressed on a hot press at 280° C. to give 3.2 mm thick platelets which were tested in accordance with UL 94 to determine their flameproof characteristics. The flameproof characteristics were V-0, corresponding to a maximum afterburning time of 10 sec after application of a flame for 10 sec.

EXAMPLE 2–7

Test platelets were prepared analogously to Example 1 from plastic granules provided with a flameproof finish using urea cyanurate, but using the plastics and amounts (% by weight) of urea cyanurate listed in Table 1. In Example 7 ammonium polyphosphate (Exolit 422, Hoechst) was also used as a further flame retardant in addition to urea cyanurate. The flameproof characteristics corresponded to fire classification V-0 in all cases.

COMPARISON EXAMPLE C1

Test platelets were prepared analogously to Example 1 from PA 6 without flame retardant. The flameproof characteristics corresponded to fire classification V-2 according to UL94, corresponding to an after-burning time of 30 seconds, burning particles additionally falling off.

COMPARISON EXAMPLE C2

Test platelets were prepared analogously to Example 1 from PA 6 to which 8% by weight of melamine cyanurate (Chemie Linz) had been added as flame retardant. The flameproof characteristics corresponded to fire classification V-0 according to UL 94. The bulk density of the granules, which was 630 g/1 (Table 1), was lower than that of the plastics finished with urea cyanurate.

TABLE 1

| | Plastic | Flame Retardant* | % by weight | Fire Classification (UL 94) | Bulk density of the granules (g/l) |
|---|---|---|---|---|---|
| 1 | PA 6 | $UC_y$ | 6 | V - 0 | 680 |
| 2 | PA 66 | $UC_y$ | 6 | V - 0 | 700 |
| 3 | TPU | $UC_y$ | 10 | V - 0 | 720 |
| 4 | ABS | $UC_y$ | 20 | V - 0 | 750 |
| 5 | SAN | $UC_y$ | 20 | V - 0 | 750 |
| 6 | PP | $UC_y$ | 25 | V - 0 | 680 |
| 7 | PP | $UC_y$ | 12.5 | | |
| | | Phosph | 12.5 | V - 0 | 680 |
| C1 | PA 6 | — | — | V - 2 | 620 |
| C2 | PA 6 | $MC_y$ | 8 | V - 0 | 630 |

*$UC_y$ Urea cyanurate
$MC_y$ Melamine cyanurate
Phosph Ammonium polyphosphate

What we claim is:

1. A flameproof plastic which contains urea cyanurate as flame retardant.

2. The flameproof plastic according to claim 1, which contains nitrogen in the polymer chain.

3. The flameproof plastic according to claim 1, which essentially consists of poilyamides, polyurethanes, polyacrylonitrile or polyacrylonitrile-containing plastics and urea cyanurate.

4. The flameproof plastic according to claim 1, which contains 5 to 20% by weight of urea cyanurate.

5. The flameproof plastic according to claim 1, in which at least 95% by weight of the urea cyanurate has a particle size of at most 0.025 mm.

6. The flameproof plastic according to claim 1, which additionally contains further flame retardants.

7. A process for improving the flameproof characteristics of plastics, in which the urea cyanurate is added as flame retardant to the plastics or to the reactants for the preparation of the plastics.

8. A method of rendering plastics flame retardant, which comprises incorporating a flame retardant amount of urea cyanurate in the plastics.

* * * * *